O. M. EDWARDS.
WINDOW AND SASH THEREFOR.
APPLICATION FILED APR. 23, 1907.
1,270,607.
Patented June 25, 1918.
4 SHEETS—SHEET 1.
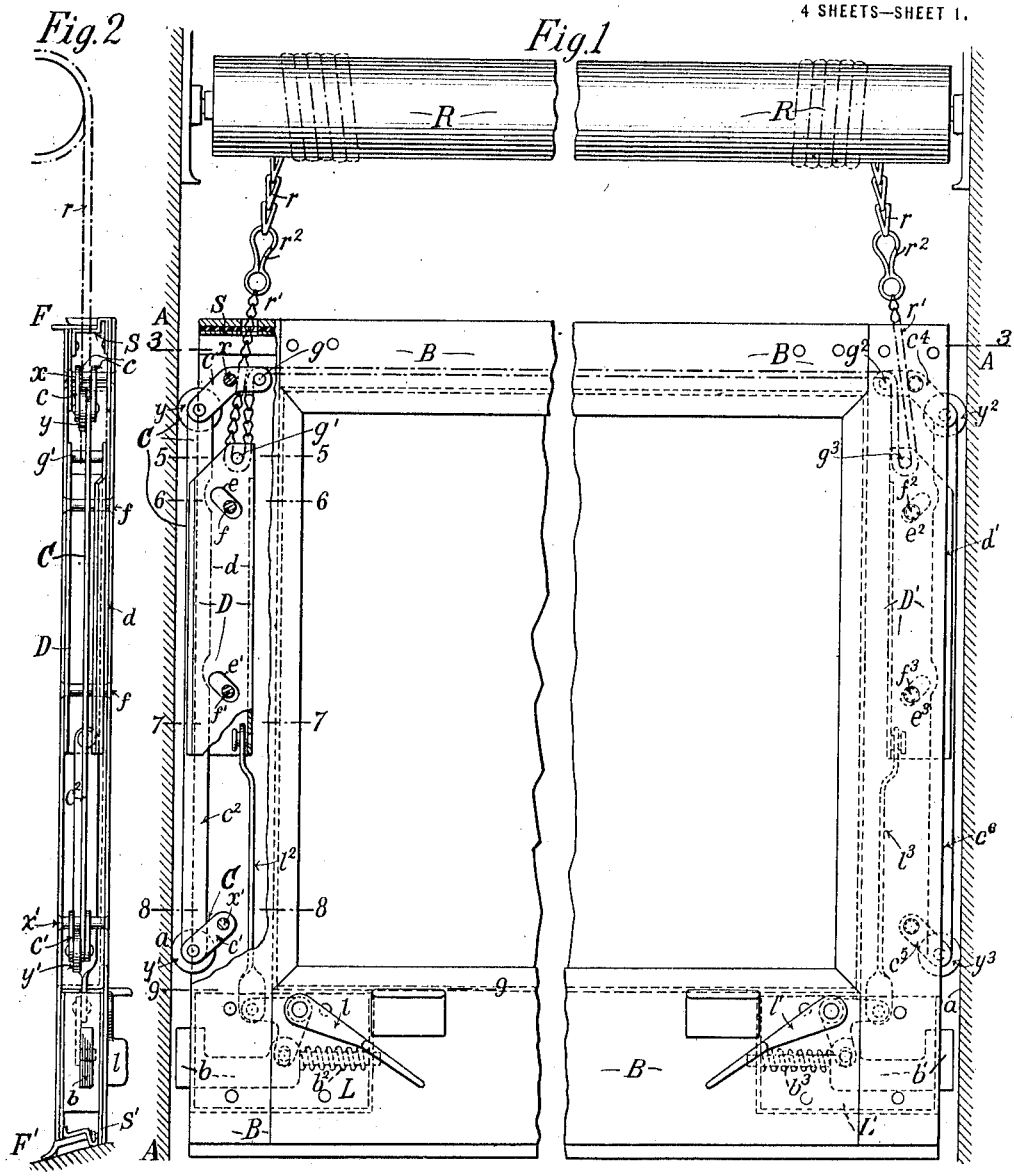
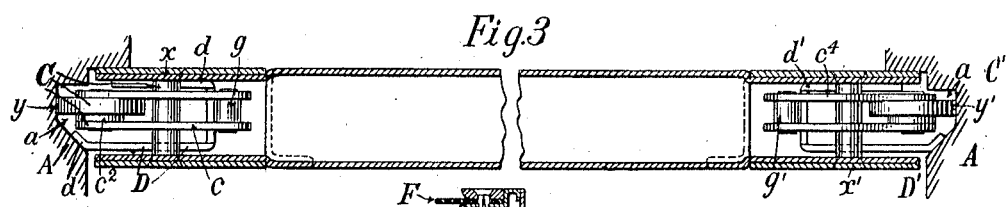
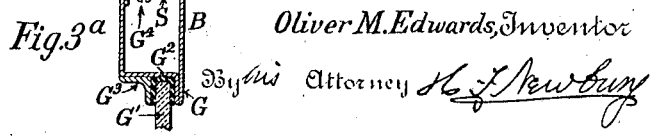
Witnesses
Raphaël Netter
C. D. Morrill
Oliver M. Edwards, Inventor
By his Attorney H. F. Newbury O. M. EDWARDS.
WINDOW AND SASH THEREFOR.
APPLICATION FILED APR. 23, 1907.
1,270,607.
Patented June 25, 1918.
4 SHEETS—SHEET 2.
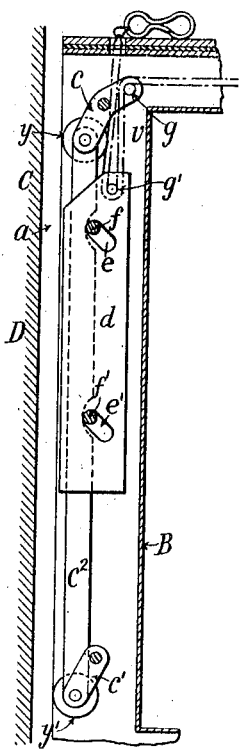
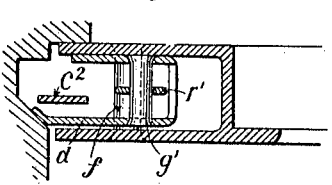
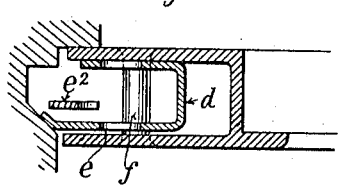
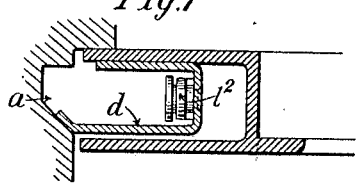
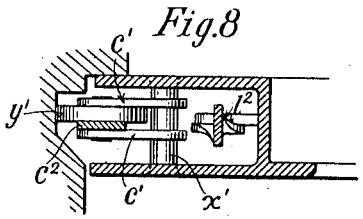
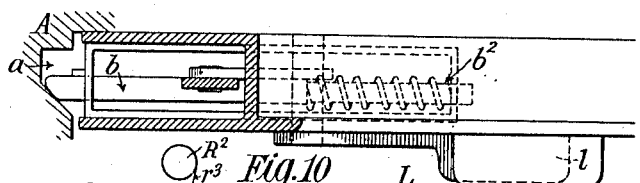
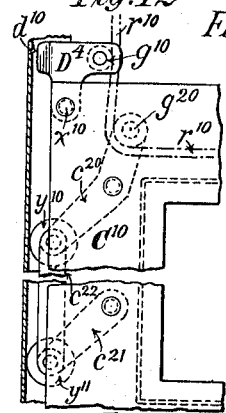
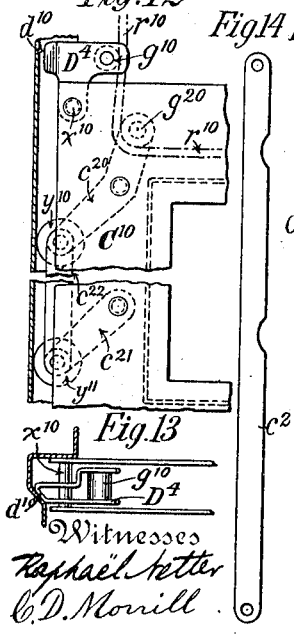
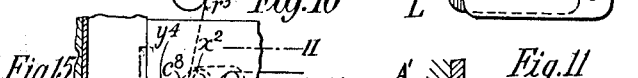
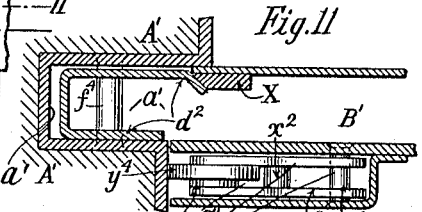
Witnesses
Raphaël Netter
C. D. Morrill
Inventor
Oliver M. Edwards
By his Attorney H. F. Newbury O. M. EDWARDS.
WINDOW AND SASH THEREFOR.
APPLICATION FILED APR. 23, 1907.
1,270,607.
Patented June 25, 1918.
4 SHEETS—SHEET 3.
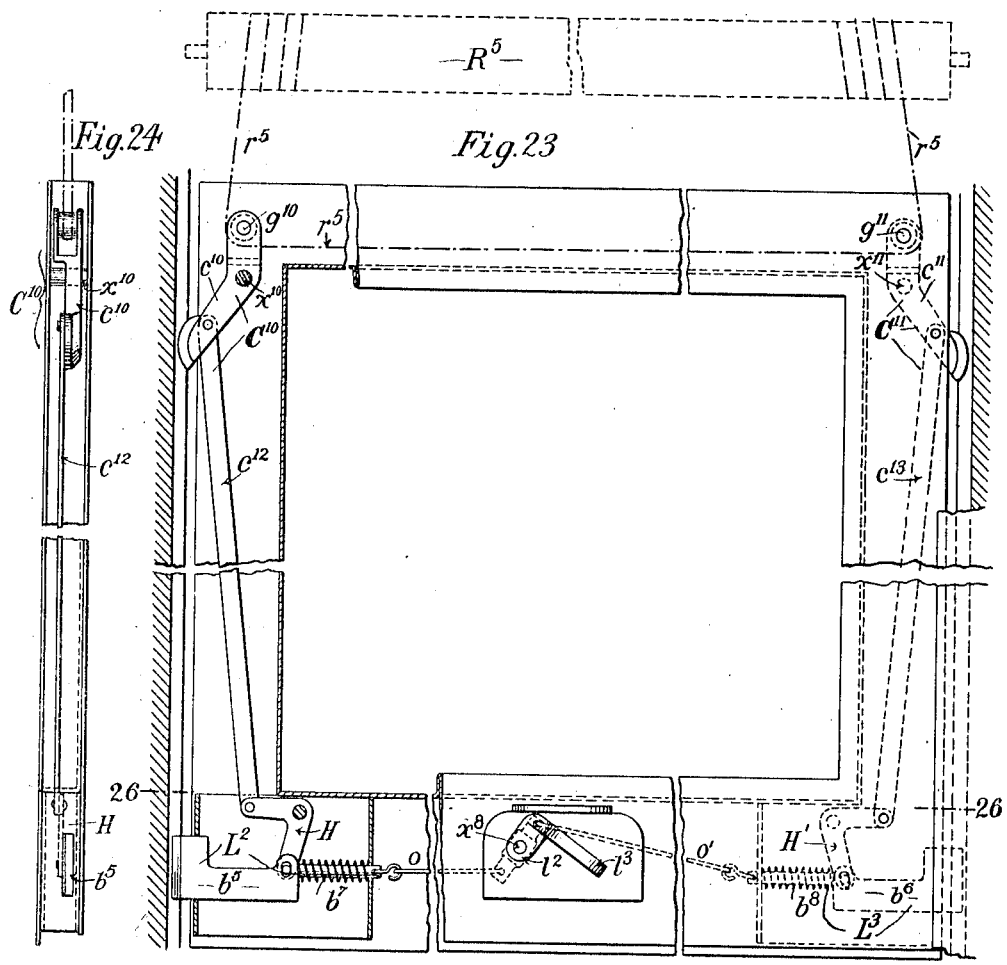
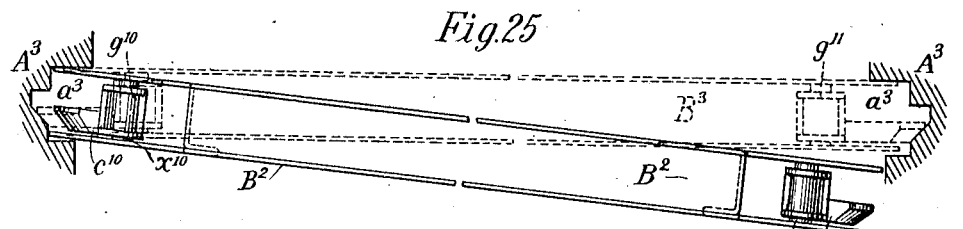
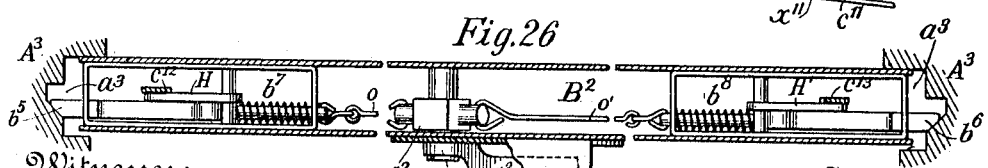

O. M. EDWARDS.
WINDOW AND SASH THEREFOR.
APPLICATION FILED APR. 23, 1907.
1,270,607.
Patented June 25, 1918.
4 SHEETS—SHEET 4.
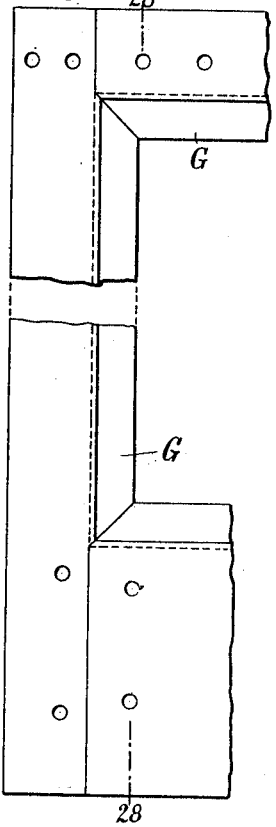
Fig.27
Fig.28
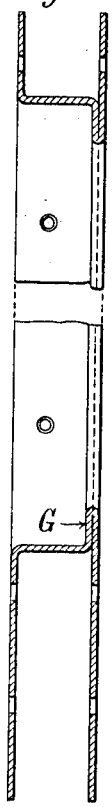
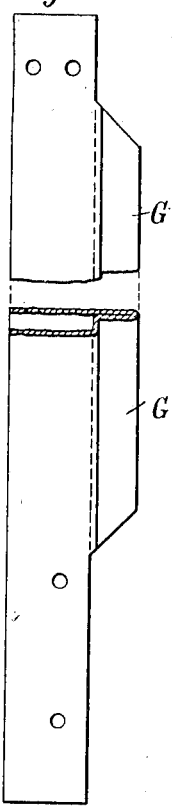
Fig.29
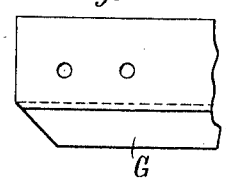
Fig.30
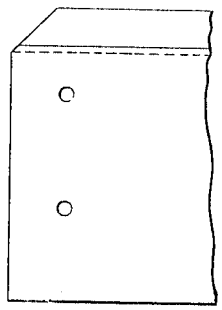
Fig.31
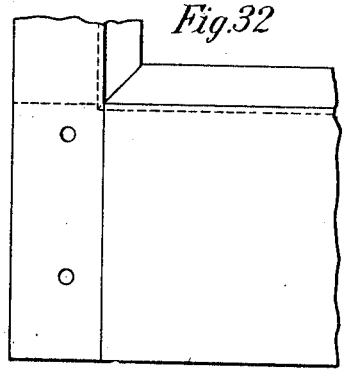
Fig.32
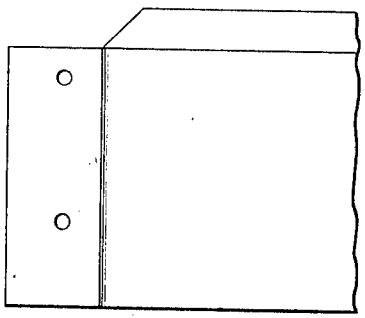
Fig.33
Fig.34
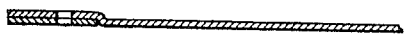
Witnesses
Raphael Petter
C. D. Morrill
Inventor
Oliver M. Edwards
By his Attorney

UNITED STATES PATENT OFFICE.

OLIVER M. EDWARDS, OF SYRACUSE, NEW YORK.

WINDOW AND SASH THEREFOR.

1,270,607.   Specification of Letters Patent.   Patented June 25, 1918.

Application filed April 23, 1907. Serial No. 369,785.

*To all whom it may concern:*

Be it known that I, OLIVER M. EDWARDS, a citizen of the United States, residing at Syracuse, county of Onondaga, State of New York, have invented certain new and useful Improvements in Windows and Sashes Therefor, of which the following is a full, clear, and exact description, reference being had to the drawings accompanying the same.

My invention relates generally to windows and sashes therefor, and it has for one of its objects to provide windows in which the sashes can be easily and quickly removed from their guide ways and be replaced therein without removing or disturbing a portion of the rim or finish of the car or other structure wherein they are used; another object is to provide windows having sashes, which are cheaply and readily constructed of metal, and are of comparatively small weight, large strength, practically non-combustible and occupy a small space in the window where used; another object is to provide sashes and sash holding means so combined with a window that the sashes are readily removed from their guideways and returned thereto without removing or disturbing any portion of the trim or finish of the car or other structure where used; another object is to provide a sash and holding devices therefor, a portion or portions of which device or devices are movable relatively to the sash and are thereby adapted to permit the sash to be removed from or returned to its guideway without disturbing or removing a portion of the trim or finish of the car or other structure where used; another object is to provide a window having sash holding means, a portion or portions of which are movably mounted on the sash, and connect with the sash balancing or other supporting means and also engage with a portion or portions of the window frame and which are movable relatively to the sash and frame and adapt the sash to be removed from and returned to its guideway or frame without disturbing or removing any portion of the trim or finish of the car or other structure where used; other objects will be apparent from the descriptions hereinafter given and from the claims annexed hereto.

With these and other objects in view the invention consists, among other things, first, in combining with the sash and its frame a movable device or devices adapted to engage therewith and hold the sash within the frame or guideway in the normal operative relations thereof and movable relatively thereto to permit of the removal of the sash from the window; second, in combining a frame having a guideway, a sash and a movable device or devices adapted to move relatively to the sash or frame to hold the sash in normal working position and also to permit of its removal therefrom without disturbing the trim or finish of the window opening of the car or other structure where such sash is used; third, in forming the rails of the sash from comparatively thin metal, securing the same together and stiffening or strengthening the sash by the addition of sash holding or other coacting devices thereto; fourth, in combining a frame having a guideway, a sash, sash balancing or supporting means, and a movable device or devices adapted to be connected to the sash balancing or supporting means and be normally held in engagement with the sash and its frame or guideway in the ordinary use of the window; fifth, in combining a frame having a guideway, a sash, the fixed portions of which are of greater width than the opening in the trim or finish of the window in which the sash is to be used and a movable device or devices adapted to be moved in one direction, relatively to such fixed portions and hold the sash in its guideway and to be moved in another direction to permit it to be removed therefrom without disturbing a portion of the trim or finish of the car or structure where used; sixth, in combining a sash, its frame and sash balancing or supporting means with two separately movable devices, each adapted to engage with the sash and frame and arranged at one edge portion of the sash, by connecting such supporting means with each of such two devices, one independently of the other; seventh, in combining a sash, its frame and sash balancing or supporting means with two separately movable devices, movable toward and away from the vertical central portion of the sash to hold it in and release it from the guideway, and arranged at one edge portion of the sash, by connecting such means with each of such two devices, one independently of the other; eighth, in combining a window, a sash, its guideway and sash balancing or supporting means with a movable device or devices by connecting such means with such device or devices, which in turn are connected with the sash and are adapted to engage with the guideway and be automatically moved toward the central portion of the sash when disconnected from the sash balancing or supporting means to permit the sash to be quickly and easily placed within and removed from its guideway; ninth, in combining in a window a sash, its frame, and sash holding devices, part of which are provided with a movable portion or portions adapted to be manually moved relatively to the guideway to permit of the removal of the sash from the frame; tenth, in combining in a window its sash, a frame, sash holding devices, part of which are provided with a movable portion or portions adapted to be manually operated, another part or portion being adapted to move independently of such manually movable portions in holding the sash in its frame, and a connection between the two parts by which both may be moved to permit of the sash being released in its guideway; and my invention also consists in the combinations of parts, devices or members hereinafter set forth and which are particularly pointed out in the claims hereunto annexed, which form a portion of this specification.

Figure 1 illustrates in front elevation one embodiment of my invention in which the window is shown with the vertical central portion broken away and also with portions of the sash and frame removed for better illustrating certain details of construction therein shown. Fig. 2 is an edge view of that portion of the window seen at the left of Fig. 1. Fig. 3 is a top view looking downwardly from a point between the sash balancing means and the sash itself. Fig. 3$^a$ shows in cross section the top rail of the sash seen in Fig. 1. Fig. 4 illustrates that which is seen at the left of Fig. 1 when the sash holding means have been moved to permit of the sash being taken out of its guideway at that edge or side of the window. Fig. 5 is a cross sectional view on line 5—5 of Fig. 1. Fig. 6 is a cross sectional view on line 6—6 of Fig. 1, showing the parts as they appear at that point. Fig. 7 is also a cross sectional view on line 7—7 of Fig. 1 and shows the connection between the operating means and a portion of the sash holding means. Fig. 8 is also a cross sectional view on line 8—8 of Fig. 1 illustrating the parts as seen at that point. Fig. 9 is also a cross sectional view on line 9—9 of Fig. 1. Fig. 10 illustrates a modified construction wherein the U shaped holding means is mounted in the window frame instead of on the sash. Fig. 11 is a cross sectional view on line 11—11 of Fig. 10 illustrating the parts as seen looking downward. Fig. 12 shows in front elevation part of a sash and window frame illustrating a modified arrangement and construction of sash holding devices and the manner of combining them with the sash, frame and sash supporting means. Fig. 13 shows in top or plan view the manner of combining the upper one of the sash holding devices or means seen in Fig. 12 with the sash and frame. Figs. 14 and 15 illustrate in front elevation and in edge view the connection between the two pivotally mounted links illustrated in Figs. 1 to 12, inclusive. Figs. 16 and 17 illustrate in front elevation and top or plan view the parts which go to make up the lever pivoted near the upper right and left hand portions of the sash, as shown in Figs. 1 to 4, inclusive. Figs. 18 and 19 illustrate in similar views the lower pivoted lever which is pivotally attached to the lower portions of the sash as seen in Figs. 1 to 4 inclusive. Fig. 20 illustrates in front elevation and edge view, one of the antifriction rolls employed in connection with the levers shown in Figs. 16 to 19, inclusive. Fig. 21 illustrates in vertical section the manner of attaching or securing the glass in position in the sash and Fig. 22 illustrates in perspective a portion of the yielding material introduced between the sash and the glass, which the sash is to receive. Fig. 23 shows a somewhat different form or embodiment of the present invention from that seen in preceding figures, there being shown in this Fig. 23 a different form of sash holding means and also a different form of securing means for fastening the different parts of the sash together from what is shown in preceding figures. Fig. 24 shows in edge view that portion of the sash seen at the left of Fig. 23. Fig. 25 shows in top view the sash and frame with the sash entered at one edge of the frame with the opposite side edge in position ready to enter the frame at that edge. Fig. 26 is a view showing the parts on line 26—26 of Fig. 23. Figs. 27 to 30, inclusive, illustrate the manner of attaching the different rails of the sash together that is shown in Figs. 23 to 26, inclusive. The parts seen in Figs. 28, 29 and 30 are removed a distance from one another to better illustrate the manner in which the parts go together to form the sash thus shown. Figs. 31, 32 and 33 illustrate the manner of putting the sash together seen in Figs. 1 to 9, inclusive.

Like letters of reference, wherever they occur, indicate corresponding parts in the several figures of the drawings.

In Figs. 1 to 9, inclusive, A represents the window frame, having a guideway as therein shown in the form of a recess $a$ in which the sash B is received and moves up and down therein in the ordinary manner. As here illustrated sash supporting or balancing means in the form of a spring roller R is employed having connected therewith chains or cords $r$ which are arranged to wind thereon as the spring is coiled up in the manner commonly practised in connection with windows of cars and other structures at the present time. This spring roller is mounted in any desired manner upon the window frame. Any desired form of sash supporting or balancing means desired may be employed, such for instance, as are well known in the art.

The sash B shown in these Figs. 1 to 9, inclusive, is formed of metal and may be formed by bending thin sheet metal into the form shown, more particularly seen in Figs. 1, 2, 3 and 21 of the drawings, where it is shown as being formed U shaped, one thickness of metal for the exterior portion of the sash and another thickness for the interior portion with a space between the legs or two portions in which the sash holding means may be mounted if desired, as there shown. When the sash is constructed in this manner the individual rails composing the sash are separately formed, as indicated in vertical section in Fig. 28 and when thus formed these rails may be secured together in any desired manner such as by lapping the two thicknesses at the corners as indicated in Figs. 3 and 32, or by any other means, as for instance by using the coacting sash holding means, as shown in Figs. 27 to 31, inclusive, in which the several rails of the sash are so secured together. The construction of the sash —B— *per se* is reserved for another application which will be a division of this application.

As shown in these Figs. 1 to 9 the holding means by which the sash is held within the guideway against movement exteriorly and interiorly, as well as edgewise, are mounted upon the sash and, as they are there shown, the movable parts thereof, are movable into and out of the space at each edge of the sash between the two thicknesses of metal or material composing those side edge portions of the sash. When the movable parts of these holding means are moved into this space such movable parts occupy no more space widthwise of the sash than do the fixed portions thereof, but when moved outwardly or away from the vertical central portion of the sash these movable parts enter the guideway in the frame and normally hold the sash therein, both when the window is being opened and closed and also against rattling, excluding dirt and preventing currents of air from passing between the sash and the guideway at the points where the two are in contact, one with the other. As here shown movable parts of the holding means are normally held in the holding positions by the stress of the spring of the spring roller, or by other supporting or balancing means, and the weight of the sash itself and when the window is to be opened or closed it is intended, as there shown, that a portion of such holding means shall be moved against the stress of such supporting or balancing means and to slightly release the sash from its firm contact with the guideway and permit it to be readily moved by the operator up and down in the guideway for the purpose of opening or closing the window. The chain, cord or other flexible material $r$ $r$ as shown in such figures is at each end connected to the spring roller and passes into the space between the exterior and interior thicknesses, which form the top rail of the sash, as clearly indicated in views 1 and 2 of the drawings and connects with the several movable members of the holding means and then passes out from such space to again connect with the spring roller. At the left hand portion of the sash the interior thickness or portion of the rail of the sash is broken away to better illustrate the connections of the chain $r$ with the movable members of the holding means at that edge of the sash.

These holding means as here shown consist of two differently acting portions C and D, and form in fact two separate and distinct holding means at each edge of the sash or side of the window there preferably being substantial duplicates of such means at opposite edges of the sash. As here shown at the left of Fig. 1 the holding means C consist of pivoted lever $c$ and a pivoted link $c'$, connected together by a connecting link $c^2$, so as to move one with the other on the pivotal connections of these parts with the sash. The lever $c$ is pivoted to the sash at $x$ and the link $c'$ is pivoted to the sash at $x'$. The lever $c$ is pivotally attached to the sash between its ends. At its outer end there is mounted, as shown, an antifriction roller $y$, which, in the normal operation of the window bears against the innermost portion of the recess or guideway $a$, as shown in Figs. 1 and 3 of the drawings. The opposite end of this lever $c$ is provided with a pin or stud $g$, over which the chain or flexible material $r$ passes, as is clearly seen at the left hand upper corner of the sash where such chain passes downwardly from the spring roller R, past the lever $c$ and around a stud or pin $g'$ in the movable member of the holding means D, thence upwardly and over the pin or stud $g$ attached to the inner end of the lever $c$ and after passing over such pin this chain or flexible material continues horizontally within the space between the two thicknesses of material composing the upper rail of the sash and passes down over a similar pin or stud $g^2$, mounted on the inner end of a similar pivoted lever $c^4$, thence downwardly again and around a pin or stud $g^3$ in the movable member of the holding means D' and thence upwardly past the pivoted lever $c^4$ and out from between the two thicknesses of the upper rail of the sash to the roller R to which that end of such chain or flexible material is attached.

As a result the stress of the spring tends to wind the opposite ends of the chain $r$ upon the shell of the roller and to pull upon such ends of the chain which tends to move the movable members $d\ d'$ of the holding means D, D' upwardly and to move the inner ends of the pivoted levers $c$ and $c^4$ downwardly causing them to turn on their pivotal connections with the sash and force the antifriction rollers $y$, $y'$, $y^2$, and $y^3$ outwardly against the opposite walls of the guideway or recess $a$ in the frame A, at the same time causing the movable members $d\ d'$ of the holding means D D' to move outwardly and upwardly, by reason of the inclined slots $e$, $e'$, $e^2$ and $e^3$ formed in said movable members and the pins or studs $f$, $f'$, $f^2$ and $f^3$ mounted in the sash. This connection of the chain or flexible material $r$ with the movable members $d\ d'$ of the holding means D D' and the inner ends of the levers $c\ c^4$ causes the weight of the sash in opposition to the stress of the spring of the roller to move such members and levers outwardly away from the vertical central portion of the sash in planes substantially parallel with the plane in which the sash moves up and down in the guideway and such connection also causes each of the movable members $d\ d'$ and the pivoted levers $c\ c^4$ to move independently of each other and each to be held in contact with the guideway with substantially equal force, the sash being moved endwise in the guideway to permit of this being done and also moved exteriorly or away from the interior of the structure against a portion of the guideway as more particularly illustrated in Fig. 3 of the drawings. In addition to the above this manner of connecting the spring roller with these several parts permits the chain or flexible material to adjust itself relatively to the points at which it engages with the other parts, so as to equalize the force exerted upon them by the stress of such spring or other sash supporting means. The pivoted lever $c^4$, pivoted links $c^5$ and connecting link $c^6$ with the movable member $d'$ of the holding means D' operate in substantially the same manner at the right hand edge of the sash that the similar parts operate at the left hand edge thereof.

The movable members $d\ d'$ of the holding means D D' are preferably formed out of thin metal by bending the same into U shape and also preferably giving one leg of the U an angular or beveled form, so as to provide a bearing surface to bear against a corresponding surface formed on or in the guideway and force the sash outwardly against the outermost portion of the guideway, as shown more particularly in Figs. 3, 5 to 7, inclusive. When constructed and arranged in the manner shown these movable members move outwardly away from the vertical central portion of the sash in a plane substantially parallel with that in which the sash moves, the beveled portion of the inner leg engaging with the beveled portion of the guideway, $a$, and forces the opposite leg of the U shaped movable member against the exterior thickness or thicknesses of the material forming the sash and in turn forces the sash against the outermost or exterior portion of the guideway to hold the sash in close and intimate contact therewith, as shown in said figures. In this way one leg of these movable members $d\ d'$ engages with the guideway and the frame and the other leg engages with the sash and by reason of such engagement the sash is forced into close and intimate contact with the guideway and such members stiffen or strengthen these portions of the sash against bending or other stress which may come upon it, and also such members coact with the sash and frame in doing this work of stiffening and strengthening the sash.

It will be observed that these movable members $c\ c^4$ and pivoted links $c'$ and $c^5$ hold the sash within the grasp of or in place in the guideway and also hold such sash in contact with such guideway. The stress of the spring of the roller normally tends to hold both forms of holding means at opposite edges of the sash in holding positions and the inclined slots in the movable members $d\ d'$ tend to move such members outwardly as they are moved toward the spring roller by the action of the spring and chain thereon and as a consequence when the sash is moved in the opposite direction the same tendency exists. To permit of the sash readily moving in the guideway these movable members $d\ d'$ must first be moved substantially out of frictional contact with the guideway against which they normally bear. As shown, this is done by means of a lever and the movable member of the holding means, as seen at the left of Fig. 1, corresponding parts $l'$, $l^3$ of locking means L' being seen at the right hand edge of the sash in dotted lines, which similarly connect with and control in a measure the movement of the movable member $d'$ of the holding means D'. Each of these locking means L and L' is provided with a sliding bolt $b$, $b'$, respectively, each of which bolts is provided with a stem and spring $b^2$, $b^3$, as shown in Fig. 1. By means of the levers $l$, $l'$, the holding means D D' may be released from their holding action and held released during the operation of opening or closing the window, after which the levers are released by the operator and the weight of the sash in opposition to the stress of the spring in the roller returns the movable members $d\ d'$ into holding contact with the guideway $a$. The release of these movable members $d\ d'$ does not in any way affect the frictional contact or holding action of the antifriction rollers mounted in the pivoted levers $c$ $c^4$ and pivoted links $c'$ and $c^5$ on the guideway, such holding action remaining substantially the same at all times whether the window is being closed or not. The action of the weight of the sash upon the pivoted levers $c$ $c^4$ constantly tends to move such levers on their pivots and force the antifriction rollers into contact with the opposite parts of the guideway and to hold the sash with substantially equal force in such guideway whether the guideways are of substantially equal width or not. It is found in the construction of cars and other structures that it is exceedingly difficult to get the guideways and openings of windows of exactly the same width and that they will vary somewhat under the most careful supervision in construction of the window openings and ordinarily window sashes are fitted to the particular frames or openings in which they are to be used. By this construction, provision is made for the guideways varying somewhat widthwise or edgewise of the sash with substantially the same holding effect of the holding means upon such varying guideways and the sash is compelled to travel substantially central of the opposite widthwise portions of the guideway, whether the widthwise opening in the guideway is of exactly standard measurement or varies somewhat therefrom. These sliding bolts $b$ $b'$ of the locking means L L' may be made to engage with steps or notches in any well known manner commonly practised by those skilled in the art at the present date, so as to lock the sash against movement in any desired position. These locking bolts $b$ $b'$ are provided with beveled ends, as shown more particularly in Fig. 9 of the drawings, which engage with a corresponding portion of the guideway $a$ with which the beveled portion of one leg of the movable members $d$ $d'$ of the holding means D D' engages, as is clearly indicated in Figs. 7 and 9.

The window is shown in Fig. 1 with the holding means in their normal holding positions, there being in fact three different forms or character of holding means arranged at each edge of the sash, as the improvement is illustrated in Figs. 1 to 9. One form or character of holding means is that composed of the pivoted levers $c$ $c^4$, pivoted links $c'$ $c^5$ and connecting links $c^2$ $c^6$. A second form or character of holding means is composed of the movable members $d$ $d'$ inclined slots $e$ to $e^3$ and fixed studs or pins $f$ to $f^3$, respectively, and the 3rd form or character of holding means is composed of the sliding beveled bolts $b$ $b'$ with their springs $b^2$ $b^3$ and connected parts. This last named form of holding means are manually operated in order to release them from their holding action and, as shown in these Figs. 1 to 9, the movement of such means manually correspondingly moves the movable members of another form or character of sash holding means just described $i.$ $e$ the movable members $d$, $d'$, of the means D, D'.

Each of these three forms or characters of holding means act upon different portions of the sash to hold it in its guideway and also to hold the sash firmly therein to exclude dirt and prevent the passage of currents of air past the sash where it is brought in contact with its guideway. Each form tends to hold the sash independently of each of the others and each is movable to release the sash and permit it to be removed from its guideway without disturbing or removing any of the "finish" or "trim" of the structure in which the sash and frame may be used. When the sash is held in its guideway by these different forms of holding means and it is desired to remove it therefrom the operation is substantially as follows, in the embodiment illustrated in these Figs. 1 to 9 inclusive:—The chain or flexible material $r$ is disconnected from the spring roller in any desired manner, so as to relieve the sash from the stress of the spring, when the pivoted levers $c$ $c^4$ with the connecting links $c^2$ $c^6$ and pivoted links $c'$ $c^5$, if entirely free, drop of their own gravity in a downward direction, as illustrated in Fig. 4 of the drawings, and at the same time the movable member or U-shaped holding means $d$ $d'$ similarly drop, moving inwardly along their inclined slots on the pins which coact with such slots and recede substantially within the fixed portions of the sash, also as disclosed in this Fig. 4, when the sash can be removed bodily from the guideway by manipulating the pivoted levers $l$ $l'$ of the locking means L L' and withdrawing the bolts $b$ $b'$ from within the guideway, these bolts move inwardly toward the central portion of the sash sufficiently to bring them wholly out of the guideway in case such bolts are employed on both edges of the sash. When these bolts $b$ $b'$ are withdrawn by manipulating the levers $l$ $l'$ and the holding means C C' and D D' are disconnected from the spring roller, as just explained there is nothing to hold the sash in its guideway or to prevent its movement toward the interior of the structure in which the sash is moved but gravity. The fixed portions of the sash, as shown in these Figs. 1 to 9, are of less width than the clear opening in the trim or finish of the structure in which the sash is used hence, the sash can be moved into and out of position for the holding devices to engage with the guideway and as these movable parts of these holding means have been moved within the space occupied by such fixed portions of the sash, they no longer prevent but permit of the ready removal of the sash for cleaning, repairs or other purposes.

When the sash is to be returned or first placed in the fixed guideway the bolts, $b$ $b'$ are withdrawn by manipulating the levers $l$ $l'$, as just described, and the sash set into its place in the frame when the levers $l$ $l'$ are released and the bolts $b$ $b'$ spring into the guideway to hold the sash therein and upon connecting the chain or flexible material $r$ with the spring roller portions of the holding means C C' D D' move outwardly away from the vertical central portion of the sash into the guideway and firmly hold it therein. This is readily and quickly done without disturbing or removing any portion of the trim or finish of the structure or window frame in which the sash is used. As shown in these Figs. 1 to 9, inclusive the chain $r$ is provided with a special link in the form of a snap hook $r^2$, which snap hook is of larger dimensions than any of the other links of the chain. These snap hooks $r^2$ can be readily unhooked from their connecting portions of the chain $r$ and owing to their size and of the chain passing through small circular openings $r'$, of lesser dimensions than the size of the snap hooks in the strengthening or stiffening strip S attached to one of the thickenesses of the upper rail of the sash, the portion of such chain between the snap hooks will not become disconnected from the pivoted levers $c$ $c^4$ and the pins or studs $g$, $g'$, $g^2$ $g^3$. The different parts of the chain can be readily disconnected and connected together again when the sash is to be removed or replaced in its guideway, as just described. This arrangement and construction of chain and snap hooks forms a convenient means of disconnecting and connecting the sash from the spring roller, whenever it is desired to remove the sash from its guideway.

When this is done it is preferable that the spring within the roller should be controlled and prevented from uncoiling when the chain is disconnected from the periphery thereof and this can be done in any well known manner before the snap hooks are unhooked, and then when such hooks are hooked up again the control of such spring should be removed so that the stress of the same may be exerted on the sash as before the removal of the sash from its frame occurred.

In forming the rails of the sash from thin metal, as heretofore described by bending or otherwise, the outermost edges of the sash are not as stiff and strong and do not form the resistance against bending that would naturally be the case if the sash were otherwise formed and it is desirable in connection with the top and bottom rails of the sash to employ what is known in the art as weatherstripping. In the construction shown in these Figs. 1 to 9, I have illustrated a form of weatherstripping and an arrangement thereof with the sash which not only enables the usual work of such stripping to be accomplished but also strengthens or stiffens the sash at its outermost portions. To do this, I employ, for instance, at the top portion of the sash the strip of metal S firmly secured to at least one of the thicknesses of metal forming the rail as indicated in the upper portion of Figs. 1 and 2 of the drawings and more clearly seen in Fig. 3ᵃ, where the parts are shown in cross section on an enlarged scale. To this strip of metal S which, as shown in Fig. 3ᵃ is arranged substantially at right angles to the exterior and interior thicknesses of the upper rail of the sash and therefore stiffens the sash against being bent, or either of the thicknesses being distorted in widthwise direction of the sash, I preferably attach a strip of flexible material as F, Figs. 2 and 3ᵃ, such as is quite commonly used at the present time by means of a bar after the manner disclosed in my Patent No. 771,133, dated September 27, 1904. This strip of flexible material is so arranged relatively to the sash as to engage with a portion of the window frame or an adjacent sash to exclude dirt and prevent currents of air passing through any opening which might naturally exist between such adjacent portion of the frame and sash. This weather stripping thus applied to this strengthening strip S at the top of the sash coacts with the frame or adjacent sash in excluding dirt and currents of air and the strip stiffens or strengthens such upper rail, as just explained. A somewhat similar strengthening or stiffening strip S' is applied to the bottom rail of the sash in a somewhat similar manner, or otherwise, as desired, so as to be firmly secured to at least one of the thicknesses or other portions of the rail of the sash to hold it in position for it to resist widthwise the bending or distorting movement of the lowermost portions of the two thicknesses of material composing the lower rail of the sash. To this strengthening strip S' a strip of flexible material or weather stripping of the character set forth in my above named patent is applied after somewhat the manner set forth in that patent so that such weather stripping F' will coact with the sill of the window in the manner therein set forth. The foregoing sets forth one form of strengthening or stiffening strips or bars which may be attached, as desired, to the upper and lower rails of the sash to stiffen the exterior and interior thicknesses of material composing said rails and also one form or manner of applying known forms of weatherstripping to such strengthening strips, so that such stripping may coact with the frame and sash to exclude dirt and currents of air.

I prefer to construct the pivoted levers $c$ $c^4$ from separate pieces of the shape seen in Figs. 16 and 17 so that the chain or flexible material may pass between such pieces and always be held in engaging position with the studs or pins $g$ to $g^3$ and with the antifriction rollers $y$ mounted between such pieces, which rollers are seen in front and edge view in Fig. 20 of the drawings.

If desired the different forms of sash holding means heretofore described need not be all mounted upon the sash, but a portion thereof may be mounted on the frame and another portion or portions upon the sash, as indicated in Figs. 10 and 11 of the drawings in which there is a modified arrangement of parts shown. As seen in Fig. 10, the frame A' of the window is provided with a recessed guideway $a'$ which guideway is of much greater dimensions than any shown in preceding figures and in this guideway $a'$ there is arranged a U shaped movable holding member $d^2$ mounted upon studs $f^4$ $f^5$ which pass through inclined slots $e^4$ $e^5$ in such movable member and coact with the sash in a somewhat similar manner to that in which the corresponding movable members $d$ $d'$ coact. That is, one leg of the U shaped member engages with the guideway and another leg engages with a portion of the sash to hold the sash in the guideway. In these Figs. 10 and 11 the movable U shaped member of the holding means $D^2$ is not connected with the sash supporting or balancing means consisting in this case of the spring roller $R^2$ and a chain, cord or flexible material $r^3$, but is provided with a separate spring $R^3$ which tends to normally hold the sash in its guideway by the stress of such spring acting upon said member $d^2$ through the inclined slots $e^4$ $e^5$ and studs or pins $f^4$ $f^5$ fixedly attached to the window frame. The holding means $C^2$ consisting of the pivoted lever $c^8$ pivoted link, $c^9$ and connecting link $c^{10}$ are mounted upon the sash in these Figs. 10 and 11 in a manner somewhat similar to that in which the corresponding holding means are mounted in preceding figures but instead of the lever $c^8$ being pivoted to the sash midway of its length, it is pivoted thereto at its inner end by the pivot, as $g^4$ and this lever is provided with a stud as $x^2$ to receive the chain or cord $r^3$, which passes around such stud and thence horizontally over to the corresponding stud and lever at the other edge of the sash all as shown in said Fig. 10.

Instead of mounting these holding means $C^2$ within the space between the exterior and interior thicknesses of material composing the side rails of the sash, such means are mounted upon the interior thicknesses and outside of the space in which the corresponding means are mounted in preceding figures. Also instead of the anti-friction rollers $y^4$ $y^5$ engaging with a part of the guideway they engage with a portion of the "trim" or "finish" of the window as clearly seen in Fig. 11, such means being covered over or inclosed and hidden from view by a cap piece fixedly attached to the interior thickness of the said rail. The exterior thickness of the said rail of the sash is provided with a stiffening or strengthening piece X attached thereto and provided with a beveled edge against which the beveled coacting portion of the U shaped holding member $d^2$ engages, as clearly seen in Fig. 11. The operation is substantially the same in this construction shown in Figs. 10 and 11 that it is in the construction illustrated in preceding figures, notwithstanding the difference in the mounting of the two differing forms of holding means.

In this construction when it is desired to remove the sash from the window frame, it is only necessary to move the movable member $d^2$ of the holding means $D^2$ upwardly so as to move it within the recess in the frame and out of engagement with the sash when the sash can be moved outwardly toward the interior of the structure in which it is used and away from the guideway in the frame in the same manner as is done in the construction shown in preceding figures. This movement of the movable member $d^2$ may be accomplished by means provided which consist of a link Z pivoted at one end to such member and at the opposite end to a disk as $z'$, which by a key can be given nearly a quarter of a turn as indicated in dotted lines in Fig. 11, when the pin connecting such link to the disk will have passed the center upon which the disk turns and will hold the member $d^2$ in an elevated position until the disk is again turned on its pivot and returned to its normal position for the movable member $d^2$, through the action of spring $R^3$, to normally hold the sash in the guideway. This disk may be turned by any known means, such for instance as a suitable key passing through the frame and into it and by which such disk can be turned on its pivot or connection with the window frame.

Different constructions and arrangements of sash holding means than those heretofore shown may be employed if desired, as for instance, the construction and arrangement shown in Figs. 12 and 13, where one side portion of a sash and holding means are shown. In these Figs. 12 and 13 two forms of holding means are illustrated and both forms are pivotally mounted on the sash and are actuated through the action of the sash supporting or balancing means thereon through the cord or chain $r^{10}$. In the construction shown in these Figs. 12 and 13, some form of holding means would preferably be used at the lower opposite corners of the sash and if desired, one of the forms heretofore shown may be employed.

The two forms $C^{10}$ and $D^4$ of holding means shown in these Figs. 12 and 13 operate in substantially the same manner that the corresponding forms operate to hold the sash in the frame, which are shown in preceding figures. The holding means $C^{10}$ is composed of the lever $c^{20}$ and the link or links $c^{21}$ and, as in preceding figures, these parts are pivotally attached to the sash and such lever and link or links are connected together by the link $c^{22}$ so that as the lever is moved the link $c^{20}$ and connecting link $c^{22}$ are correspondingly moved. The lever $c^{20}$ is provided at its uppermost end with a stud or projection $g^{20}$ around which the cord or chain $r^{10}$ connecting with the sash supporting or balancing means passes in a manner somewhat similar to that in which the corresponding cord or chain passes around and engages with the corresponding levers in preceding figures.

The holding means $D^4$ is shown in the form of an elbow lever which is pivotally mounted, as there shown, on the upper left hand corner of the sash at $x^{10}$. The opposite end of such lever is provided with a stud or projection $g^{10}$ with which the chain or cord $r^{10}$ engages, as shown, to force the central portion $d^{10}$ of such elbow lever into contact with the guideway formed in the window frame as such cord or chain is acted upon by the sash supporting or balancing means.

In forming the several rails of the sash of bent up sheet metal a flange G is preferably provided having two thicknesses of metal which flange tends to hold the glass G' against movement in one direction, as seen more particularly in Figs. 21 and 27 of the drawings. To hold the glass within the sash with a yielding pressure some flexible material $G^2$ as india rubber, felt, etc., may be employed the preferred form of which is seen in Fig. 22, which receives the glass G' and is held to the frame by an angle bar $G^3$, as indicated in Fig. 21. The flexible material and glass are held to the frame by an angle bar $G^3$, as indicated in Figs. $3^a$ and 21. This angle bar $G^3$ may be held or secured in position on the sash by any suitable means but preferably by split rivets, as $G^4$, which, when forced through the bar, spread at their innermost ends and firmly hold the bar in place.

In Figs. 1 to 9, inclusive, the sash is shown with its fixed portions widthwise of slightly less dimensions than the widthwise opening between the trim or finish of the window frame so that such sash can be placed in and removed from its guideway by simply moving its sash holding means fully within such fixed portions and pushing it through and taking it from such opening. When this is done there is necessarily a slight space between the fixed portions of the sash widthwise and the trim or finish of the car which forms the opening through which the sash is passed in placing it in and taking it out of its guideway. If desired the sash may be made of greater width than such opening in the trim or finish of the structure through which it is to be introduced into and removed from its guideway, as is illustrated in Figs. 23, 24, 25 and 26. In this case the guideway is preferably of somewhat greater width than is required where the sash is moved bodily back into position for the holding devices to engage with its guideway, as may be done in Figs. 1 to 9. This increased width or depth of the guideway permits one edge of the sash to be introduced into the guideway ahead of the other edge and moved back therein sufficiently to permit the opposite edge to pass through the opening in the trim or finish of the structure in the manner illustrated in Fig. 25, where the sash $B^2$ is shown in full lines with its left hand edge introduced into the guideway as far as it will enter and the right hand edge is shown as just ready to enter the guideway after passing through the opening in the trim or finish of the structure, so as to occupy the position seen in that figure in dotted lines, where the sash has been moved centrally, in its guideway by its holding devices and both of the opposite side edges of the sash widthwise are received within the guideway and occupy a greater space than that of the opening in the trim or finish of the structure through which the sash was introduced into such guideway. This central position of the sash $B^2$ in this guideway $a^3$ formed in the frame $A^3$ is seen in full lines in Fig. 26 wherein the sash is seen in its normal position with the holding devices in engagement with the guideway to hold the sash therein. As here seen the fixed portions of the sash widthwise are of greater dimensions than the opening in the trim or finish of the structure through which the sash was introduced into its guideway and there is no direct opening between the edge portions of the sash at its opposite sides and such opening. Also as here shown the sash is forced exteriorly of this structure against the guideway by the holding devices acting on the beveled portions of the guideway, so as to exclude the passage of dirt and currents of air between the exterior portion of the sash and its coacting portions of the guideway.

As seen in these Figs. 23 to 26, inclusive, a somewhat different embodiment of holding devices than what is shown in Figs. 1 to 9 inclusive is illustrated. In these latter figures as is clearly seen in Figs. 23 and 24 the lever form of holding devices are arranged at the upper right and left hand corners of the sash and the chain or cord $r^5$ engages with the upper or free ends of such levers and passes from one to the other with the ends thereof attached to the sash supporting or balancing means herein indicated, which are shown in the form of a spring roller $R^5$. The connection of this chain or cord $r^5$ with the sash balancing or supporting means and the upper ends of these holding levers is such that such upper ends are made to move toward one another by the stress of the spring of such supporting means as the same is exerted on said levers. This chain or flexible cord $r^5$ thus tends to force the lower ends of such levers away from one another or outwardly and into engagement with the opposite side portions of the guideway. The levers $c^{10}$ $c^{11}$ of these holding means $C^{10}$ $C^{11}$ are pivotally connected with the sash at $x^{10}$ $x^{11}$ and are preferably provided at their upper ends with studs and antifriction rollers over which the chain or flexible cord $r^5$ passes, as before explained. The lower ends of these levers $c^{10}$ $c^{11}$ are beveled and rounded as shown so as to engage with the beveled portions of the guideway, as indicated in dotted lines in Fig. 25, such holding devices $C^{10}$ $C^{11}$ being there seen in both full and dotted lines. As there seen in full lines such holding means are moved toward the vertical central portion of the sash so as to be within the fixed portions thereof ready to permit the sash to be entered into its guideway or removed therefrom and these same holding levers are shown in said Fig. 25 in dotted lines in the positions they occupy when the beveled and rounded lower portions of the levers $c^{10}$ $c^{11}$ are in engagement with the beveled portions of the guideway to hold the sash in position therein, as seen in Figs. 23 and 26.

The lower right and left hand corners of the sash, seen in these Figs. 23 to 26, are provided with holding means $L^2$ $L^3$ having sliding bolts $b^5$ $b^6$, each of which is provided at its inner end with a stem bearing coiled springs $b^7$, $b^8$, respectively. The stems of these bolts $b^5$ $b^6$ are connected to a pivoted lever $l^2$ by links $o$ $o'$, respectively, which lever is pivoted to the sash at $x^8$. This lever $l^2$ is provided with a handle $l^3$ by which it may be turned on this pivot $x^8$ and the sliding bolts $b^5$ $b^6$ moved toward each other and thereby withdrawn from engagement with the guideway, and upon such lever being moved far enough these bolts can be fully withdrawn into the space occupied by the fixed portions widthwise of the sash to permit of the sash being introduced into and removed from its guideway, as before explained. The springs $b^7$ $b^8$ will be of sufficient tension to properly force the bolts $b^5$ $b^6$ outwardly and into contact with the beveled portions of the guideway with the desired force to properly hold the sash in its guideway and as such sash can move edgewise within the guideway each bolt will naturally be held in equal frictional contact with the guideway in the normal operation of the window. Each of these sliding bolts $b^5$ $b^6$ has connected therewith one end of each of the elbow levers H H', respectively, the other ends of which elbow levers are connected by links $c^{12}$ $c^{13}$, respectively, with the levers $c^{10}$ $c^{11}$, respectively, of the holding means $C^{10}$ $C^{11}$, heretofore described, so that when these sliding bolts are moved out of engagement with the guideway and into the space occupied by the fixed portions of the sash the levers $c^{10}$ $c^{11}$ will also be thus moved to permit of the ready removal and introduction of the sash from and into the guideway. By this means the stress or tension exerted upon the chain or flexible cord $r^5$ may be overcome, without disconnecting such chain or cord from the sash supporting means, and the holding devices moved toward the vertical central portion of the sash, so as to not obstruct the removal and introduction of the sash from and into its guideway. In ordinary practice it will be preferable to disconnect the chain or cord $r^5$ from the sash supporting means or so control such means that substantially no stress or tension will be exerted upon such cord or chain during the time the sash is being removed from or introduced into the guideway.

In the embodiment of the invention illustrated in these Figs. 23 to 26, inclusive, as in the embodiment seen in preceding figures the sash holding means are movable to and from the vertical central portion of the sash and are movable in planes substantially parallel with the plane in which the sash itself moves up and down in its guideway in opening and closing the window. Also the sash is held firmly in the guideway and is easily and quickly removable from its guideway as occasion may require. Also the guideways formed in the structure to receive these sashes may vary widthwise within certain bounds and yet each sash of standard dimensions will be received and held therein with substantially equal force and this will permit of the use of sashes of standard dimension widthwise in different sized guideways, if the variation be not too much and as a consequence the cost of construction of the window frames or guideways is lessened and in addition a sash having its glass broken can be removed and another of the same standard dimensions inserted in its place without any substantial delay or taking the time necessary to remove the broken glass and insert a new one.

The present invention permits of the easy and quick removal of a sash from its guideway and the quick and easy replacement thereof or of the introduction of another similar sash in any event where it becomes desirable to remove one sash and replace it with another.

The sash shown in these Figs. 23 to 26 inclusive may be made of thin metal either bent up into shape as illustrated in preceding figures or they may be otherwise made accordingly as the constructor sees fit, as for instance, the sash may be made by bending thin sheet metal into form for each individual rail thereof and then these rails may be put together and secured one to the other, after the manner illustrated in Figs. 27 to 33, by the use of the casings in which the sash holding devices or means are movably mounted, in which case the sash will be stiffened or strengthened by the use of such coacting means for this purpose. Or the different portions of the sash may be put together as indicated in Figs. 3 and 34 of the drawings or otherwise.

In any event it is preferred to supply the sash with weather stripping attached to strengthening or stiffening strips as indicated in preceding figures, so that such weather stripping may coact with the portions of the window adjacent to the sash in the manner heretofore described.

The manner of forming the sash herein set forth, whether it be by the bending of sheet metal or otherwise forming the sash out of thin metal affords a cheap and readily constructed sash and one having the capacity of occupying but a small space. The sash can be, as a whole made comparatively thin and yet provide ample space to receive the glass and sash holding means and permit the movable part of such means to be moved within the widthwise or other dimensions of the fixed portions of the sash. When made from thin sheet metal into form so as to provide an exterior and interior thickness the sash can be made of comparatively small weight and yet be as durable as the sash of greater weight and have all of the advantages of a light weight sash in the use thereof.

In Fig. 27 there are shown two corner sections of a sash of the above mentioned character wherein the rails are secured together by the use of the casings or mountings of the sash holding devices. In Fig. 28 the parts thus shown are seen on line 28—28 of Fig. 27 before such casings or mountings have been put into place and secured to the sash rails forming the sash. In Figs. 29, 30 and 31 the same parts shown in Fig. 27 are illustrated but separated from one another so as to better illustrate the manner of securing the same together, portions of the lower corner sections being removed and partly shown in section. Figs. 32, 33 and 34 illustrate a corner section where the rails forming the same are shown as being differently put together from what is seen in preceding figures and in Fig. 33 one rail portion is shown removed from the other to better illustrate the manner of securing such sections together which may be the same as indicated in Fig. 34 and the sash be constructed after the manner illustrated in Figs. 1, 2 and 3 of the drawings. As here shown rivets are used, but other securing means may be employed if desired.

What is herein shown and described naturally suggests to the minds of those skilled in this art other specific embodiments of this invention and also modifications in the construction and arrangements of parts wherein substantially the same results may be accomplished by combinations of elements or devices having essentially the same mode of operation as the combinations have that are particularly pointed out in the claims hereunto annexed; hence I do not wish to limit my invention to the specific forms and arrangements herein set forth, but desire to include all forms and arrangements which embody the spirit of my invention and which have substantially the same mode of operation as do the specific parts and arrangements of the same that are herein shown and described.

The term "sash supporting means" used in the claims hereunto annexed is intended to include all forms of means which operate to wholly or partially support or in any way to balance the weight of the sash accordingly as the constructor sees fit to organize his individual structure.

What I claim as new is:—

1. The combination of a sliding window sash movable in guideways in the window frame and two sets of means carried by the sash for holding the sash from sliding movement in the guideway, the sets operating independently of each other, one set operating to transmit force to the sash in an edgewise direction and the other operating to coact with the guideway and force the sash bodily in a direction at an angle to the direction of movement in which the former set acts, substantially as and for the purpose set forth.

2. The combination of a sliding window sash movable in guideways in the window frame, two sets of means carried by the sash for holding the sash from sliding movement in the guideway, the sets operating independently of each other, one set operating to transmit force to the sash in an edgewise direction and the other operating to coact with the guideway and force the sash bodily in a direction at an angle to the direction of movement in which the former set acts, the manual means connected to one set for releasing the holding of the window from said set without releasing the other sets, substantially as and for the purpose described.

3. In a window the combination, substantially as set forth, of a frame provided with a guideway, a sash adapted to move in such guideway, a plurality of separately movable holding means, each adapted to coact with the sash at one edge portion thereof, a portion of each of such plurality of holding means being adapted to be connected with sash balancing means and be separately movable thereby, and sash balancing means adapted to be connected with the movable portions of such holding means.

4. The combination of a sliding window sash movable in guideways in the window frame, two sets of means carried by the sash and holding the sash from sliding in the guideway, the sets operating independently of each other, one set operating to transmit force to the sash in an edgewise direction and the other set operating to coact with the guideway and force the sash in the direction at a right angle to the direction in which the former set acts, sash balancing means connected to the holding means and operating to normally hold the same in operative position, and manually operable means connected to one set of holding means to move said set out of operative position without releasing the other set, substantially as and for the purpose specified.

5. In a window the combination, substantially as set forth, of a frame provided with a guideway, a sash adapted to move in such guideway, and a plurality of separately movable holding means arranged at one edge portion of the sash and carried thereby, each movable into and out of position for holding the sash in and removing it from the guideway, a portion of such means being manually movable to remove the sash from its guideway.

6. In a window the combination, substantially as set forth, of a frame provided with a guideway, a sash the fixed portions of which are adapted to move in such guideway, and a U shaped holding device one leg of which bears upon one of such portions of the sash and the other upon a side wall of the guideway for pressing the sash bodily toward the other side wall of the guideway.

7. In a window the combination, substantially as set forth, of a frame provided with a guideway, a sash movable in such guideway, movably mounted holding means mounted on the sash at each edge portion of the window, each provided with a plurality of bearing rollers to bear against the frame, which rollers are connected so as to move together and both holding means being movable in the same general plane, and sash balancing means connected to the holding means to move the sash edgewise in the frame with substantially equal effect by the bearing rollers.

8. In a window the combination, substantially as set forth, of a frame provided with a guideway, a sash movable in such guideway, and a plurality of movable holding means mounted at each edge portion of the sash, and carried thereby, one of which plurality tends to move the sash edgewise and another tends to move it sidewise when both of such means are in engagement with the sash and frame.

9. In a window the combination, substantially as set forth, of a frame provided with a guideway, a sash adapted to move in such guideway, and a plurality of movable holding means mounted at each edge portion of the sash, and carried thereby, one of which plurality tends to move the sash edgewise and another tends to move it sidewise when both of such means are in engagement with the sash and frame and both are also movable in the same general planes when moved to place the sash in and remove it from the guideway.

10. In a window the combination, substantially as set forth, of a frame provided with a guideway, a sash adapted to move in the guideway, a plurality of movable holding means carried by the sash and mounted at each edge portion thereof and engageable with the frame in the normal operation thereof, means adapted to hold such holding means in holding position and means carried by the sash adapted to move one of such holding means substantially out of holding position to permit of the sash being readily moved in its guideway.

11. In a window the combination, substantially as set forth, of a frame provided with a guideway, a sash adapted to move in such guideway, a plurality of movable holding means mounted at one edge portion of the window, both of which are adapted to move into and out of holding positions to permit the sash to be placed in and be removed from its frame, and means connected with the movable portions of such plurality of means to automatically move such portions into holding positions.

12. In a window the combination, substantially as set forth, of a frame provided with a guideway, a sash, adapted to move in such guideway a plurality of movable holding means mounted at one edge portion of the window, each of which is movable into and out of holding position to permit the sash to be placed in and be removed from its frame and the movable portion of each is movable relatively to the movable portion of the other, and means connected with the movable portions of such plurality of holding means adapted to permit each of such portions moving independently of the other in the guideway.

13. In a window the combination, substantially as set forth, of a frame provided with a guideway, a sash the fixed portions of which are adapted to be received by and be moved therein, and U-shaped holding means arranged with its open portion farthest from the vertical central portion of the sash which means are adapted to frictionally engage with both the guideway and the sash to force the sash bodily against one wall of the guideway.

14. In a window the combination, substantially as set forth, of a frame provided with a guideway, a sash adapted to move in such guideway, U-shaped holding means arranged with its open portion farthest from the vertical central portion of the sash, and a second holding means a portion of which is adapted to be received in the space between the legs of the U-shaped holding means and engage with the guideway to hold the sash therein.

15. In a window the combination, substantially as set forth, of a frame provided with a guideway, a sash adapted to move in such guideway, U-shaped holding means mounted upon the sash with its open portion farthest from the vertical central portion of the sash, and a second holding means, also mounted on the sash, and arranged to work between the legs of the U-shaped holding device in holding the sash in its guideway.

16. The combination with a window frame having in each of its side walls a sash receiving guideway including fixed front walls, a window sash movable into and out of the frame and having recesses in its side edges for registering with the guideways, devices having parts movable into and out of the recesses in the edges of the sash and coöperating with the walls of the guideways for holding the sash in the frame and for permitting the removal of the sash from the frame, means tending to maintain the devices in holding positions, manual operating means and connections therefrom to said devices for shifting the latter from said holding positions, substantially as and for the purpose described.

17. The combination with a window frame having in each of its side walls sash receiving guideways including fixed front walls, a window sash movable into and out of the frame and having recesses in its side edges for registering with the guideways, devices having parts movable into and out of the recesses in the edges of the sash and coöperating with the walls of the guideways for holding the sash in the frame and for permitting the removal of the sash from the frame, means tending to maintain the devices in holding positions, manual operating means carried by the sash, and connections therefrom to said devices for shifting the latter from said holding positions, substantially as and for the purpose specified.

18. The combination with a window frame having sash guideways in opposite sides thereof, a sash of less width than the minimum distance between side walls of said guideways on one face of the frame, sash balancing means, parts at each side of the sash mounted to occupy a position within the plane of the adjacent edge of the sash, and a second position beyond said plane, a connection between each of said parts and the sash balancing means, whereby the balancing means tends to maintain said parts in one of the positions thereof aforesaid, and means for disconnecting said parts from the sash balancing means for moving the parts into the other of said positions, substantially as and for the purpose set forth.

19. The combination with a window frame having sash guideways therein, a sash, movable means at one edge of the sash for engaging a wall of the adjacent guideway at separated points, and additional holding means interposed between said edge of the sash and the adjacent guideway and operating between said separated points, substantially as and for the purpose described.

20. The combination with a frame having sash guideways therein, a sash, means at one edge of the sash for engaging a wall of the adjacent guideway at separated points, and tending to move the sash in an edgewise direction, and additional holding means interposed between said edge of the sash and said guideway, and spaced from the separated points and tending to move the sash in a widthwise direction, substantially as and for the purpose specified.

21. The combination with a frame having sash guideways therein, of a sash, sash balancing means, means at one edge of the sash for engaging one wall of the adjacent sash guideway at separated points, said means being connected to the sash balancing means to be shifted in one direction thereby, and additional holding means interposed between the said edge of the sash and a wall of said sash guideway, said additional means being also connected to the sash balancing means to be shifted thereby, substantially as and for the purpose set forth.

22. The combination with a frame having sash guideways therein, of a sash, sash balancing means, means at one edge of the sash for engaging one wall of the adjacent sash guideway at separated points, said means being connected to the sash balancing means to be shifted in one direction thereby, additional holding means interposed between the said edge of the sash and a wall of said sash guideway, said additional means being also connected to the sash balancing means to be shifted thereby, and manual operated means connected to the additional holding means for shifting the same, substantially as and for the purpose described.

23. The combination with a frame having sash guideways therein, of a sash, sash balancing means, means at one edge of the sash for engaging one wall of the adjacent sash guideway at separated points, said means being connected to the sash balancing means to be shifted in one direction thereby, additional holding means interposed between the said edge of the sash and a wall of said sash guideway, said additional means being also connected to the sash balancing means to be shifted thereby, manual operated means carried by the sash and connected to the additional holding means for shifting the same, substantially as and for the purpose specified.

24. In combination, a sash having a recess opening out through one side edge thereof, sash holding means mounted in the recess and having parts for contacting at separated points with a wall of the sash guideway, and additional holding means also mounted in the recess and having a surface for contacting with another wall of said guideway, substantially as and for the purpose described.

25. In combination, a sash having a recess opening out through one side edge thereof, sash holding means mounted in the recess and having parts for contacting at separated points with a wall of the sash guideway, additional holding means spaced from the first-named means and coöperating with another wall of the guideway, and a tension device common to both of said means, substantially as and for the purpose specified.

26. The combination with a window frame having sash guideways therein, a sash provided with a recess in one side edge, sash holding means mounted therein having rolling contact at separated points with the wall of the adjacent guideway, additional holding means coöperating with the sash and another wall of said sash guideway, and means common to both holding means for placing the same under tension, substantially as and for the purpose set forth.

27. The combination with a window frame having sash guideways therein, a sash provided with a recess in one side edge, sash holding means mounted therein having rolling contact at separated points with the wall of the adjacent guideway, additional holding means coöperating with the sash and another wall of said sash guideway, and sash balancing means for actuating both of said holding means, substantially as and for the purpose set forth.

28. The combination with a window frame having sash guideways therein, a sash provided with a recess in one side edge, sash holding means mounted therein having rolling contact at separated points with the wall of the adjacent guideway, additional holding means contacting with the sash and another wall of said sash guideway, sash balancing means for actuating both of said holding means, and means for moving the additional holding means out of sash holding position, substantially as and for the purpose described.

29. The combination with a frame having sash guideways therein, a sash porvided with a recess opening out through one side edge, and a bar having two legs, one of greater length than the other, one of the legs engaging with the wall of the recess in the sash and the other leg engaging with the wall of the adjacent guideway, and the leg of greater length having an engaging part disposed at an angle to the engaging part of said shorter leg, substantially as and for the purpose described.

30. The combination with a frame having sash guideways therein, a sash provided with a channel in its side edge, a member formed with inclined surfaces having a part pressing against one side wall of the recess and another part coacting with one wall of the guideway, said wall of the guideway and the part of said member coacting therewith being arranged at an incline in order to force said member toward said side of the channel, means tending to force said member lengthwise of the channel in one direction, fixed abutments located in the channel and coacting with inclined surfaces on said member, the surfaces and abutment being arranged to force said member edgewise relatively to the window, and manual means operated to move said member in a direction opposite to the direction in which said member is moved by the means tending to force it in the lengthwise direction, substantially as and for the purpose specified.

OLIVER M. EDWARDS.

Witnesses:
GEORGE G. NORRIS,
STANTON MALLERY.

Copies of this patent may be obtained for five cents each, by addressing the "Commissioner of Patents, Washington, D. C."